F. H. GIBBS.
MINE CAR WHEEL AND ATTACHING MEANS THEREFOR.
APPLICATION FILED OCT. 31, 1916.
1,245,142. Patented Oct. 30, 1917.
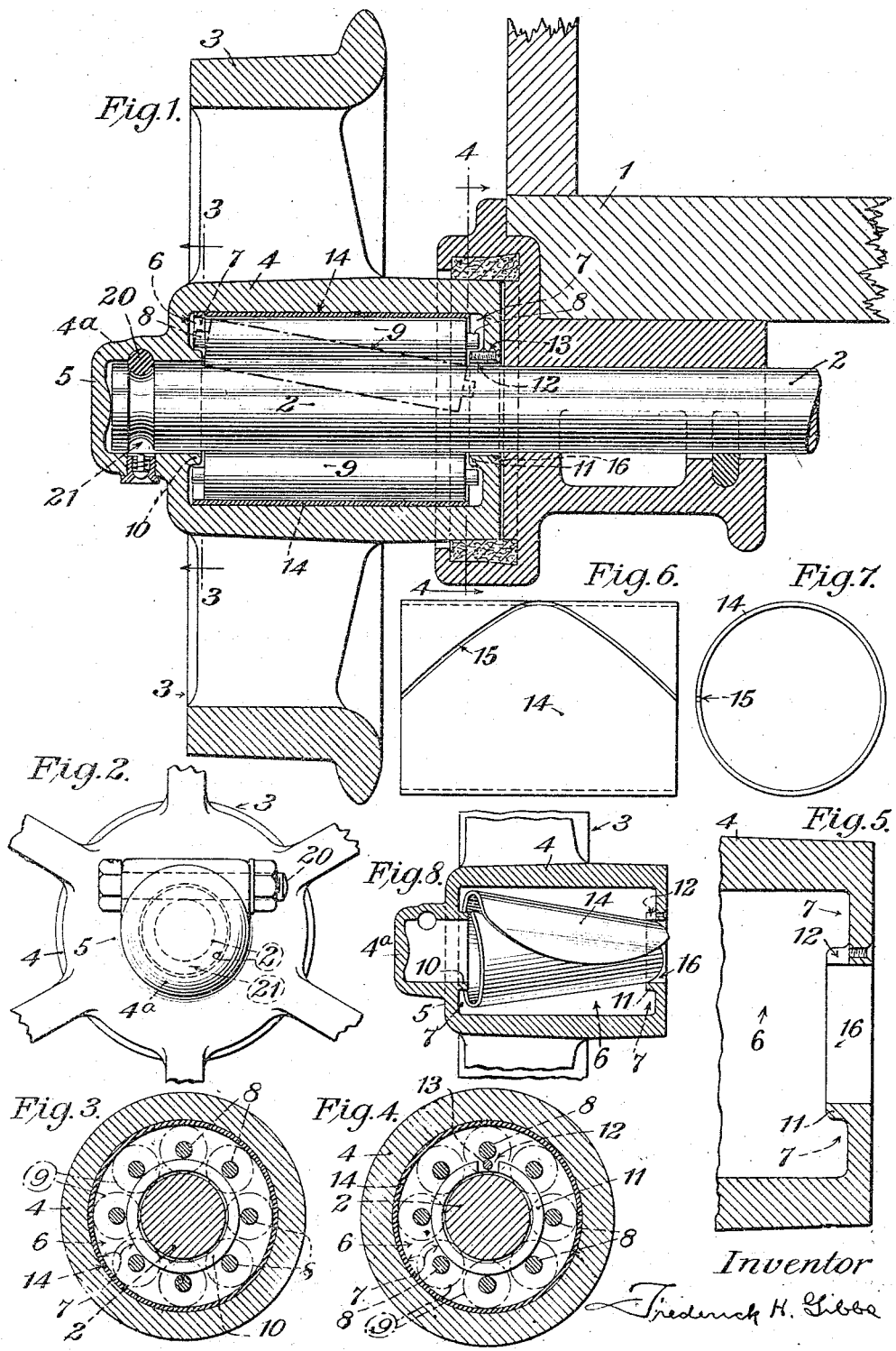

UNITED STATES PATENT OFFICE.

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY.

MINE-CAR WHEEL AND ATTACHING MEANS THEREFOR.

1,245,142.  Specification of Letters Patent.  Patented Oct. 30, 1917.

Application filed October 31, 1916. Serial No. 128,718.

*To all whom it may concern:*

Be it known that I, FREDERICK H. GIBBS, residing at borough of Brooklyn, county of Kings, city and State of New York, and being a citizen of the United States, have invented certain new and useful Improvements in Mine-Car Wheels and Attaching Means Therefor, of which the following is a full, clear, and exact description, such as will enable others skill in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a relatively central, vertical, longitudinal, sectional view taken through the improved wheel through a journal box or pedestal, and a fragment of a mine car;

Fig. 2 is an end elevational view of the wheel hub showing fragments of the spokes;

Fig. 3 is a sectional view, the section being taken on line 3—3 of Fig. 1;

Fig. 4 is a similar view, the section being taken on line 4—4 of Fig. 1;

Fig. 5 is an enlarged detail fragmentary view of the extreme inner end of the hub in section as in Fig. 1;

Fig. 6 is an elevational view of the roller bearing sleeve which is inserted in the hub;

Fig. 7 is an end elevational view of said sleeve; and

Fig. 8 illustrates the manner of placing the sleeve in the hub for service.

The principal object of the invention is to simplify the construction of roller bearing mine car wheels and eliminate unnecessary parts while producing for service a structure, possessing durability and ruggedness, preferably adapted to be attached to an axle by means penetrating the wheel.

Another object of the invention is to produce a wheel, of the type referred to formed from a single casting with integral seats therein for bearing rollers adapted to co-operate with the journal of a mine car axle.

As it is sometimes necessary to remove wheels of this type from the axle, simple means are also provided for preventing accidental displacement of the rollers when the wheel is removed.

Referring to the parts, 1 indicates a fragment of a mine car, 2 an axle and 3 a wheel which, in the present instance, is provided with a hub portion 4 and a closed outer end 5.

Within the hub 4 is a bearing roller chamber 6 which is provided at each end with an annular channel 7 to receive spindles 8 of bearing rollers 9 and to retain said bearing rollers 9 in position, the hub is provided at its outer end with an annular flange 10 defining the inner boundary of the channel 7, which flange is continuous, that is, it is uninterrupted, while at the opposite end of the hub a flange 11 forms the inner boundary of the inner channel 7 and said flange 11 is intermitted at 12, as best shown in Fig. 5, and, if desired, there may extend into said intermitted portion of the flange 11, a removable set screw 13, the purpose of which will be hereinafter explained.

Circumscribing the interior of the hub is a lining or bearing face 14 which is cut at 15 from end to end so as to permit said member 14 being formed into a tube of less diameter than the axle opening 16 in the wheel hub. The tube 14 is preferably formed of spring metal which, when compressed as shown in Fig. 8 and inserted through the axle opening 16, will expand radially and fill the bearing roller chamber within the wheel hub, thereby providing a smooth and continuous bearing face for the bearing rollers 9 within the wheel hub.

As the flanges 10 and 11 are cast integral with the hub 4, it is evident that one of said flanges should be discontinuous to facilitate the insertion of the bearing rollers 9 and, in this instance, the inner flange is intermitted, as best shown in Figs. 4 and 5. Before the set screw 13 is positioned, the bearing rollers may be inserted, one at a time, as indicated by the dot and dash lines in Fig. 1 in which the outer end of the roller is positioned with its spindle 8 within the bearing roller chamber 6, and after the spindle at the outer end of said roller is thus inserted, the inner spindle is passed through the intermitted portion of the flange 11 and the rollers may be inserted, one at a time, in this manner, being permitted to drop to a lower position within the wheel hub after being thus inserted, after which, if desired, the set screw 13, or any suitable pin or other means, may be inserted to fully or partly close the gap between the ends of the flange 11, thus providing support for the spindle at the inner end of the hub which may come into coincidence with the opening 12 when the wheel is removed from its axle.

To lock the wheel in position, the outer end of the hub is preferably closed and provided with an extension 4ª through which a locking bolt or pin 20 is projected, said pin resting in an annular recess 21 formed in the outer end portion of the axle 2, as shown in Fig. 1, thereby locking the wheel upon said axle.

In its preferred form the hub is closed at its outer end and has one opening at the inner end of a diameter approximately that of the axle 2.

Through this opening only can the rollers 9 be inserted or removed and then only when the wheel is removed from the axle.

The bearing-roller chamber being of greater diameter than the axle opening, and the flanges 10—11 being integral with the hub, insures against accidental loss of roller-retaining flanges or roller-retaining cages, common in mine car wheels, and insures the correct positioning of the roller bearing sleeves 14 in the hub.

What I claim is:

1. A roller bearing wheel formed as a single casting provided with oppositely disposed annular channels for receiving the ends of rollers with one of the flanges forming part of one of said channels intermitted to facilitate insertion.

2. A roller bearing wheel adapted to be locked upon an axle and formed as a single casting provided with oppositely disposed annular channels for receiving the ends of rollers with one of the flanges forming part of one of said channels intermitted to facilitate insertion.

3. A roller bearing wheel formed as a single casting provided with oppositely disposed annular channels for receiving the ends of rollers with one of the flanges forming part of one of said channels intermitted to facilitate insertion of rollers therein, and with an extension at one end of its hub portion adapted to receive therein a pin to attach the wheel to an axle.

4. In combination in a roller bearing wheel, a cast metal hub formed with flanged roller channels cast within said hub at predetermined distances apart, the flanges of said channels being spaced from the inner face of the hub and forming supports for bearing rollers and a single set of rollers lapping said flanges.

5. In a wheel, a cast metal hub formed with an integral annular roller retaining channel in each end, a wall of one of said channels being intermitted to facilitate insertion of bearing rollers, and bearing rollers extending longitudinally of said hub.

6. In a roller bearing wheel, a cast metal hub having a bearing-roller-pocket of homogeneous metal provided with one discontinuous flange adapted to facilitate the insertion of bearing rollers in said pocket.

7. A roller-retaining mine car wheel formed from a single casting including a roller-retaining-flange within each end of its hub, one of said flanges being discontinuous.

8. A roller-retaining mine car wheel formed from a single casting including a continuous roller-retaining flange at one end and an intermitted roller-retaining flange at the other end of its hub.

9. A roller-bearing wheel comprising a cast metal hub portion with a homogeneous internally disposed roller-bearing-retaining flange near each end and one of said flanges being intermitted to facilitate insertion of bearing rollers.

10. A roller bearing wheel formed as a single casting provided with oppositely disposed annular channels for receiving the ends of rollers with but one of the flanges forming part of one of said channels intermitted to facilitate insertion of said rollers and a roller bearing sleeve held in position by said channels.

11. A roller bearing wheel adapted to be locked upon an axle and formed as a single casting provided with oppositely disposed integral annular flanged channels for receiving the ends of rollers, and a roller bearing sleeve held in position in said wheel by said channels.

12. In combination, a cast metal hub formed with an integral flange at each end spaced from the inner face of said hub and forming supports for bearing rollers, a roller bearing sleeve held in said hub by said flanges, and a single set of rollers lapping said flanges.

13. In a wheel, a cast metal hub formed with a flanged integral annular roller retaining channel in each end, a wall of one of said channels being intermitted to facilitate insertion of bearing rollers, a bearing sleeve or lining in said hub, said sleeve being longer than the shortest distance between the flanges of said channels, and bearing rollers extending longitudinally of said hub within said sleeve.

14. A roller-retaining mine car wheel formed from a single casting including a roller-retaining-flange within each end of its hub, one of said flanges being discontinuous and a roller-bearing sleeve of a length greater than the shortest distance between said flanges, 15. A roller-retaining mine car wheel formed from a single casting including a continuous roller-retaining flange at one end and an intermitted roller-retaining flange at the other end of its hub, and an expansible sleeve of a length sufficient to lap both said flanges.

In witness whereof I have hereunto set my hand in the presence of two witnesses.

FREDERICK H. GIBBS.

Witnesses:
 FLORA M. CURTIS,
 C. L. BELCHER.